P. A. NEETESON

IMPROVEMENTS IN SHIFTING ARRANGEMENTS FOR TWO-CORE-PER-BIT SHIFT REGISTERS

Filed June 26, 1961

INVENTOR
PIETER A. NEETESON.
BY Frank R. Jifari
AGENT 3,112,472
Patented Nov. 26, 1963

3,112,472

IMPROVEMENTS IN SHIFTING ARRANGEMENTS FOR TWO-CORE-PER-BIT SHIFT REGISTERS

Pieter Adrianus Neeteson, Eindhoven, Netherlands, assignor to North American Philips Company, Inc., New York, N.Y., a corporation of Delaware Filed June 26, 1961, Ser. No. 119,438
Claims priority, application Netherlands Aug. 29, 1960
4 Claims. (Cl. 340—174)

This invention relates to improvements in magnetic-core shift registers.

Generally, such shift registers comprise two groups of cores each core being composed of magnetic material having a rectangular hysteresis loop. All the cores of one group are inductively coupled with a common conductor and each core of a group is coupled via a unilaterally conductive element with a core of the other group, the latter core in turn being coupled via a unilaterally conductive element to the next-following core of the first group. The common conductors are alternately supplied with pulses which serve to transfer information from one group to the other and to rewrite information in the first group.

Such a shift register is described, for example, in an article titled "Magnetic Delay Line Storage" in "Proceedings I.R.E.," vol. 39, April 1951, pages 401–407. In the shaft register so described, each group of storage cores is controlled by a separate sequence of pulses. The two pulse sequences are spaced in time relative to each other and may be derived in known manner from a single pulse sequence. To this end the single pulse sequence may be to a dividing circuit having outputs which supply the shift pulses for the shift register.

A primary object of the invention is to achieve effective control of the shift register by means of a control circuit is simpler and more economical than the foregoing arrangement.

Briefly, in accordance with the invention, all the cores of one group are also inductively coupled with a second common conductor. The first and the second common conductor of one group are respectively connected to an output and an input of an electronic amplifying element, and pulses are fed to all cores which serve to change, in the same direction, the magnetization state of the cores. The arrangement is such that a core magnetized in the reverse direction holds the corresponding amplifying element temporarily in a conductive state by the reaction of the voltage of one common conductor on the other common conductor.

This shift register has the advantage that the shift pulses can be fed to one control-terminal and that no additional pulse amplifiers are required. This provides a great economy in the required number of transistors or tubes; this number is reduced to two per shift register.

The invention will now be described more fully with reference to the drawing, in which.

Figure 1:
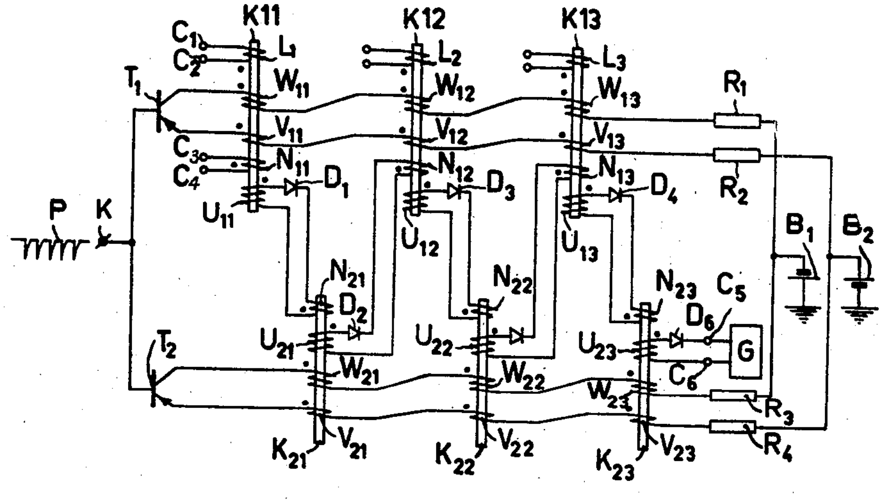
FIGURE 1 is a schematic circuit diagram of one embodiment.

FIGURE 1 illustrates a shift register having three storage places. The invention is not restricted to a three-place register, the particular number of places shown in FIG. 1 being for illustrative purposes only. Each storage place requires two storage cores, one of which is used as an intermediate storage element.

The information is supplied in binary form to the cores K11 to K13. Under the control of a shift pulse of the pulse sequence P the information is transferred from the cores K11 to K13 to the cores K21 to K23, respectively. The subsequent shift pulse transfers the information from the cores K21 and K22 to the cores K12 and K13 and also transfers the information from core K23 to the load G.

Each winding is shown in FIG. 1 with a dot at one end. This dot indicates that the voltage at that end of the winding is positive with respect to the other end when a change of the core magnetic flux in the positive direction takes place.

Figure 2:
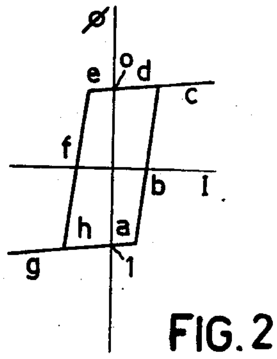
FIGURE 2 shows the relationship between the flux $\phi$ in a core and the excitation current I passing through a winding coupled to the core.

A core may be in one of two different remanence states. In FIGURE 2 the positive remanence state is indicated by the digit 0 and the negative remanence state by the digit 1.

To explain the operation of FIG. 1, it is assumed that the cores K11 to K23 are initially all in the state 0. It is furthermore assumed that K11 is changed into the state 1 at a given instant within a time interval between two shift pulses. For this purpose a pulse is fed at a suitable instant to the input winding L1, the pulse having a polarity to render positive the voltage at the terminal C1 with respect to the terminal C2. In a similar manner the cores K12 and K13 may be brought into the state 1 by supplying pulses to the input windings L2 and L3. During the change in magnetization of the core K11 from the state 0 to the state 1 the flux $\phi$ changes first in the negative direction along the branches *e*, *f*, and *g* of the hysteresis loop shown in FIGURE 2 and subsequently in the positive direction along the branches *g* and *h*. Thus the other windings coupled to the cores have first induced into them a negative voltage and subsequently a positive voltage lower in magnitude than said negative voltage. For the duration of the negative voltage the diode D1 is cut off and the emitter voltage of the transistor T1 is reduced, so that the transistor T1 remains non-conducting. The number of turns of the winding U11 is such that the magnitude of the positive voltage induced therein is lower than the threshold voltage of the diode D1 and is too low to render the transistor T1 conductive by the increase in the emitter voltage. The next shift pulse applied at the terminal K has an amplitude sufficient to render the transistors T1 and T2 momentarily conducting. The current flowing through the transistor T1 flows from the positive terminal of the battery B2, through the resistor R2 and the windings V13 to V11 towards the emitter electrode and from the collector electrode through the windings W11 to W13 and the resistor R1 towards the negative terminal of the battery B1. In a similar manner current flows through the transistor T2 through the resistor R4 and the windings V23 to V21 towards the emitter electrode and from the collector electrode through the windings W21 to W23 and the resistor R3.

The circuit arrangement is such that the number of turns of each of the windings W exceeds the number of turns of each of the windings V. Consequently, the effect of the collector current predominates. The application of the shift pulse results in all the cores being energized in the positive sense. As an alternative, the shift pulses may be fed to an additional winding, coupled with all cores. The operation remains the same in this case. The cores which are in the state 0 experience a flux variation along the branches *d* and *c* of the hysteresis loop, whereas the flux of the core K11 varies along the branch *a* and part of the branch *b*.

It was assumed that the cores K12, K13 and K21 to K23 were all in the state 0, so that only a low positive voltage is induced into the windings coupled with these cores. The flux passing through the core K11 varies, however, to a greater extent. Consequently, into the winding V11 is induced a positive voltage, which has an amplitude such that the transistor T1 is driven further in the conducting state. As a result the collector current increases and the flux through the core increases further along the branch *b* of the hysteresis loop. This effect is regenerative as long as the flux rises along the branch *b* of the hysteresis loop, so that the shift pulse at the base electrode can be ended. The transistor T1 then remains conducting owing to the regenerative effect of the collector winding W11 on the emitter winding V11; however, the transistor T2 becomes non-conducting because there is no corresponding regenerative effect in any of the cores K21–K23. As a result the flux in the cores K22 and K23 returns to the remanence state 0 along the branches *c* and *d* of the hysteresis loop.

The positive flux variation in the core K11 induces a positive voltage into the winding U11, so that the diode D1 becomes conductive and a current therefore flows through the winding N21 coupled with the core K21. The polarity and the amplitude of this current are such that the flux in the core K21 changes in the negative direction along the branches *c, d, e* and *f* of the hysteresis loop.

As soon as the flux in core K11 has risen to the branch *c* of the hysteresis loop, the induced voltage across the winding V11 decreases rapidly. Thus the current through the transistor T1 drops and the flux of the core K11 passes along the branches *c* and *d* of the hysteresis loop to the remanence point 0. The transistor T1 is then non-conducting and the cores K11 to K13 are all in the state 0.

The flux of the core K21 must reach the branch *g* of the hysteresis loop at the same instant or earlier than the flux of the core K11 reaches the branch *c*. This is achieved by providing more turns for the windings designated U than for those designated N. The current passing through the winding N21 subsequently decreases rapidly, so that the flux of core K21 passes along the branch *h* of the hysteresis loop to the remanence point 1.

The next shift pulse applied to terminal K produces via the transistors T1 and T2 a positive excitation of all cores. The core K21 is then in the state 1, so that the transistor T2 remains conducting after the shift pulse has terminated owing to the regenerative effect of the collector winding W21 on the emitter winding V21. The winding U21 of the core K21 is connected through the diode D2 to the winding N12 of the core K12, so that core K12 changes to the remanence state 1 at the instant when the core K21 changes to the state 0. During this change-over a positive voltage is induced into the winding N21. This voltage could react upon the winding U11 of the core K11. However, the effect is slight, since the winding N21 has fewer turns than the winding U11; the effect may be further reduced by using diodes having a suitable threshold value.

It was assumed that at a given instant only the core K11 was in the state 1. It is of course possible that a further core or that two or more of the cores K11 to K13 be simultaneously in the state 1. If then a shift pulse occurs at the terminal K, the transistor T1 remains in the conducting state owing to the regenerative effect of the windings W on the windings V until all cores K11 to K13 have changed over to the state 0. The core K11 transfers in the described manner its information condition to the core K21. The cores K12 and K13 transfer their information condition to the cores K22 and K23 respectively. To this end the cores K12 and K13 are provided with output windings U12 and U13, which are connected via the diodes D3 and D4 to the input windings N22 and N23 of the cores K22 and K23 respectively.

A pulse dividing circuit may be obtained in a simple manner by connecting the output terminals C5 and C6 of the core K23 to the terminals C3 and C4 of the winding N11 of the core K11. The dividing circuit is started by feeding a pulse to the winding L1 at a suitable time, this pulse bringing the core K11 into the state 1. After the next shift pulse the core K21 is in the state 1 and after the sixth shift pulse the core K11 is again in the initial state. In general, a dividing circuit may thus be obtained, which has a division ratio of $2n$, wherein $n$ is the number of cores of each group.

While the invention has been described with respect to a specific embodiment, many modifications thereof will be apparent to those skilled in the art without departing from the inventive concept, the scope of which is set forth in the appended claims.

What is claimed is:

1. A shift register comprising two groups of bistable magnetic cores, first and second amplifying devices each having an input electrode, an output electrode and a control electrode, first and second common conductors for each group of cores, the first common conductors being inductively coupled to all the cores of the associated group and being respectively connected to the output electrodes of said amplifying devices, the second common conductors being inductively coupled to all the cores of the associated group and being respectively connected to the input electrodes of said amplifying devices, means coupled to the cores of the first group for selectively applying information in the form of information pulses thereto, said information pulses placing the associated cores in a first remanence state, means for applying shift pulses simultaneously to both said control electrodes, each shift pulse causing momentary current flow in the first common conductors, each core which is in said first remanence state being changed to the second remanence state by a shift pulse and acting to deliver a sustaining voltage to the input electrode of the associated amplifying device which continues the current flow, each core of one group being coupled by means of a unilaterally conductive element with a core of the other group, a core of one group which is changed from said first remanence state to said second remanence state by a shift pulse delivering a transfer pulse to the core of the other group to which it is coupled, said transfer pulse placing said core of the other group in said first remanence state.

2. A shift register comprising two groups of bistable magnetic cores, first and second transistors each having an emitter electrode, a collector electrode and a base electrode, first and second common conductors for each group of cores, the first common conductors being inductively coupled to all the cores of the associated group and being respectively connected to the collector electrodes of said transistors, the second common conductors being inductively coupled to all the cores of the associated group and being respectively connected to the emitter electrodes of said transistors, means coupled to the cores of the first group for selectively applying information in the form of information pulses thereto, said information pulses placing the associated cores in a first remanence state, means for applying shift pulses simultaneously to both said base electrodes, each shift pulse causing momentary current flow in the first common conductors, each core which is in said first remanence state being changed to the second remanence state by a shift pulse and delivering a sustaining voltage to the emitter electrode of the associated transistor which continues the current flow, each core of one group being coupled by means of a unilaterally conductive element with a core of the other group, a core of one group which is changed from said first remanence state to said second remanence state by a shift pulse delivering a transfer pulse to the core of the other group to which it is coupled, said transfer pulse placing said core of the other group in said first remanence state.

3. A shift register comprising two groups of bistable magnetic cores, first and second transistors each having an emitter electrode, a collector electrode and a base electrode, first and second common conductors for each group of cores, the first common conductors being wound around all the cores of the associated group and being respectively connected to the collector electrodes of said transistors, the second common conductors being wound around all the cores of the associated group and being respectively connected to the emitter electrodes of said transistors, the number of turns of said first common conductors around each core being greater than the number of turns of said second common conductors, means coupled to the cores of the first group for selectively applying information in the form of information pulses thereto, said information pulses placing the associated cores in a first remanence state, means for applying shift pulses simultaneously to both said base electrodes, each shift pulse causing momentary current flow in the first common conductors, each core which is in said first remanence state being changed to the second remanence state by a shift pulse and delivering a sustaining voltage to the emitter electrode of the associated transistor which continues the current flow, each core of one group being coupled by means of a unilaterally conductive element with a core of the other group, a core of one group which is changed from said first remanence state to said second remanence state by a shift pulse delivering a transfer pulse to the core of the other group to which it is coupled, said transfer pulse placing said core of the other group in said first remanence state.

4. A shift register comprising two groups of bistable elements, first and second amplifying devices each having an input electrode, an output electrode and a control electrode, first and second common conductors for each group of elements, the first common conductors being coupled to all the elements of the associated group and being respectively connected to the output electrodes of said amplifying devices, the second common conductors being coupled to all the elements of the associated group and being respectively connected to the input electrodes of said amplifying devices, thereby providing a positive feedback path between the output and the input of each amplifying device, means coupled to the elements of the first group for selectively applying information in the form of information pulses thereto, said information pulses placing the associated elements in a first stable state, means for applying shift pulses simultaneously to both said control electrodes, each shift pulse causing momentary current flow in the first common conductors, each core which is in said first stable state being changed to the second stable state by a shift pulse and delivering a sustaining voltage to the input electrode of the associated amplifying device to continue the current flow, each element of one group being coupled by means of a unilaterally conductive device with an element of the other group, an element of one group which is changed from said first stable state to said second stable state by a shift pulse delivering a transfer pulse to the element of the other group to which it is coupled, said transfer pulse placing said element of the other group in said first stable state.

References Cited in the file of this patent

UNITED STATES PATENTS

| | | |
|---|---|---|
| 2,957,165 | Newhouse | Oct. 18, 1960 |
| 2,970,295 | Bonn | Jan. 31, 1961 |
| 3,047,842 | Johnston | July 31, 1962 |